(12) United States Patent
Grof et al.

(10) Patent No.: US 10,967,404 B2
(45) Date of Patent: Apr. 6, 2021

(54) XRF ANALYZER FOR IDENTIFYING A PLURALITY OF SOLID OBJECTS, A SORTING SYSTEM AND A SORTING METHOD THEREOF

(71) Applicants: SOREQ NUCLEAR RESEARCH CENTER, Yavne (IL); SECURITY MATTERS LTD., D.N. Hevel Eilot (IL)

(72) Inventors: Yair Grof, Rehovot (IL); Tzemah Kislev, Mazkeret Bathya (IL); Nadav Yoran, Tel Aviv (IL); Haggai Alon, Kibbutz Naan (IL); Mor Kaplinsky, Herzliya (IL)

(73) Assignees: SOREQ NUCLEAR RESEARCH CENTER, Yavne (IL); SECURITY MATTERS LTD., D.N. Hevel Eilot (IL)

( * ) Notice: Subject to any disclaimer, the term of this patent is extended or adjusted under 35 U.S.C. 154(b) by 166 days.

(21) Appl. No.: 16/311,290

(22) PCT Filed: Jun. 21, 2017

(86) PCT No.: PCT/IL2017/050688
§ 371 (c)(1),
(2) Date: Dec. 19, 2018

(87) PCT Pub. No.: WO2017/221246
PCT Pub. Date: Dec. 28, 2017

(65) Prior Publication Data
US 2019/0193119 A1    Jun. 27, 2019

Related U.S. Application Data

(60) Provisional application No. 62/352,661, filed on Jun. 21, 2016.

(51) Int. Cl.
B07C 5/34 (2006.01)
G01N 23/223 (2006.01)
B07C 5/342 (2006.01)

(52) U.S. Cl.
CPC .......... B07C 5/3412 (2013.01); B07C 5/3427 (2013.01); G01N 23/223 (2013.01); G01N 2223/643 (2013.01)

(58) Field of Classification Search
CPC ....... B07C 5/34; B07C 5/3412; B07C 5/3427; G01N 23/223; G01N 2223/643
(Continued)

(56) References Cited

U.S. PATENT DOCUMENTS 3,671,744 A * 6/1972 Nikiforos ............. G01N 23/223
378/48
6,850,592 B2 2/2005 Schramm et al.
(Continued)

FOREIGN PATENT DOCUMENTS

DE 10 2013 013 108 A1 12/2015
WO 97/25692 7/1997
(Continued)

Primary Examiner — Terrell H Matthews
(74) Attorney, Agent, or Firm — Browdy and Neimark, P.L.L.C.

(57) ABSTRACT

The present invention discloses a novel XRF analyzer capable of simultaneously identifying the presence of a marking composition in a plurality of objects by modulating/varying the intensity of the excitation beam on the different objects and measuring the secondary radiation thereof. The XRF analyzer comprises a radiation emitter assembly adapted for emitting at least one X-Ray or Gamma-Ray excitation radiation beam having a spatial intensity distribution for simultaneously irradiating the plurality of objects; a radiation detector for detecting secondary radiation X-Ray signals arriving from a plurality of objects in response to irradiation of the objects by X-Ray or Gamma-Ray radia-
(Continued)

tion, and providing data indicative of spatial intensity distribution of the detected data X-Ray signals on the plurality of objects; and a signal reading processor in communication with the detector, the processor being adapted for receiving and processing the detected response X-Ray signals to verify presence of the marking composition included at least one surface of each object of the plurality objects.

20 Claims, 5 Drawing Sheets

(58) Field of Classification Search
USPC .......................................................... 209/589
See application file for complete search history.

(56) References Cited

U.S. PATENT DOCUMENTS 8,590,800 B2    11/2013   Baque

| | | | |
|---|---|---|---|
| 2001/0045378 A1 | 11/2001 | Charles et al. | |
| 2004/0247080 A1* | 12/2004 | Feda | H05G 1/46 |
| | | | 378/101 |
| 2006/0171504 A1 | 8/2006 | Sommer et al. | |
| 2007/0111021 A1 | 5/2007 | Nakamaru et al. | |
| 2010/0001720 A1 | 1/2010 | Mizutani et al. | |
| 2011/0222654 A1 | 9/2011 | Sommer et al. | |
| 2013/0079918 A1* | 3/2013 | Spencer | G01N 23/02 |
| | | | 700/223 |
| 2015/0028219 A1* | 1/2015 | Baque | G09F 3/02 |
| | | | 250/395 |
| 2016/0370307 A1* | 12/2016 | Creighton | G01N 23/223 |
| 2017/0276803 A1* | 9/2017 | Battyani | G01T 1/366 |

FOREIGN PATENT DOCUMENTS

| | | | | |
|---|---|---|---|---|
| WO | 2004/078043 A1 | 9/2004 | | |
| WO | 2017/134660 A1 | 8/2017 | | |
| WO | WO-2017221246 A1 * | 12/2017 | ............ | B07C 5/3412 |

* cited by examiner

XRF ANALYZER FOR IDENTIFYING A PLURALITY OF SOLID OBJECTS, A SORTING SYSTEM AND A SORTING METHOD THEREOF

TECHNOLOGICAL FIELD

The invention is directed to a novel XRF analyzer for identifying a plurality of solid objects, a sorting system and method thereof.

BACKGROUND ART

References considered to be relevant as background to the presently disclosed subject matter are listed below:
PCT publication number WO 1997/025692
US patent application publication number US 2011/222654
US patent application publication number US 2001/045378

Acknowledgement of the above references herein is not to be inferred as meaning that these are in any way relevant to the patentability of the presently disclosed subject matter.

BACKGROUND

Generally, methods for identifying solid objects involve determining a physical property or properties of each object, and grouping together objects sharing a common property or properties. Such properties may include color, hue, texture, weight, density, transmissivity to light, sound, or other signals, and reaction to stimuli such as various fields. Methods to determine these properties include visual identification of a material by a person, identification by the amount and/or wavelength of the light waves emitted or transmitted, eddy-current separation, heavy-media plant separation, and X-ray fluorescence detection.

X-ray fluorescence spectroscopy has long been a useful analytical tool in the laboratory for classifying materials by identifying elements within the material, both in academic environments and in industry. The use of characteristic X-rays such as, for example, K-shell or L-shell X-rays, emitted under excitation provides a method for positive identification of elements and their relative amounts present in different materials, such as metals and metal alloys. For example, radiation striking matter causes the emission of characteristic K-shell X-rays when a K-shell electron is knocked out of the K-shell by incoming radiation and is then replaced by an outer shell electron. The outer electron, in dropping to the K-shell energy state, emits X-ray radiation characteristics of the atom.

The energy of emitted X-rays depends on the atomic number of the fluorescing elements. Energy-resolving detectors can detect the different energy levels at which X-rays are fluoresced, and generate an X-ray signal from the detected X-rays. This X-ray signal may then be used to build an energy spectrum of the detected X-rays, and from the information, the element or elements which produced the X-rays may be identified. Fluorescent X-rays are emitted isotropically from an irradiated element and the detected radiation depends on the solid angle subtended by the detector and any absorption of this radiation prior to the radiation reaching the detector. The lower the energy of an x-ray, the shorter the distance it will travel before being absorbed by air. Thus, when detecting X-rays, the amount of X-rays detected is a function of the quantity of x-rays emitted, the energy level of the emitted X-rays, the emitted X-rays absorbed in the transmission medium, the angles between the detected X-rays and the detector, and the distance between the detector and the irradiated material.

Although X-ray spectroscopy is a useful analytical tool for classifying materials, with current technology the cost is high per analysis, and the time required is typically minutes or hours. Scrap yard identification of metals and alloys is primarily accomplished today by trained sorters who visually examine each metal object, one at a time. Contamination is removed by shearing. A trained sorter observes subtle characteristics of color, hue, texture, and density to qualitatively assess the composition of the metal. Sometimes, spark testing or chemical "litmus" testing aids in identification. The process is slow and inaccurate, but is the most common method in existence today for sorting scrap metal to upgrade its value.

There have been disclosed a variety of systems and techniques for classifying materials based on the X-ray fluorescence of the material. Some of these systems involve hand-held or bench-top X-ray fluorescence detectors. Some of these systems include serially conveying pieces of material along a conveyor belt and irradiating each piece, in turn, with X-rays. These X-rays cause each piece of material to fluoresce X-rays at various energy levels, depending on the elements contained in the piece. The fluoresced X-rays are detected, and the piece of material is then classified, based on the fluoresced X-rays, and sorted in accordance with this classification.

Such disclosed systems, however, have not been widely accepted commercially because they require about one second or more to detect the X-rays and accurately classify the piece of material accordingly, and they are costly relative to the number of objects identified per unit time.

Moreover, current worldwide environmental concerns have fueled an increase in efforts to recycle used equipment and articles containing materials that can be reused.

Therefore there is a need in providing a system and method capable for identifying a plurality of existing, used solid objects at high speed and accuracy without specially producing new identifiable solid objects.

GENERAL DESCRIPTION

The present invention provides a novel XRF analyzer capable of simultaneously identifying the presence of a marking composition in a plurality of objects by modulating/varying the intensity of the excitation beam on the different objects and measuring the secondary radiation thereof. The XRF analyzer comprises a radiation emitter assembly adapted for emitting at least one X-Ray or Gamma-Ray excitation radiation beam having a spatial intensity distribution for simultaneously irradiating the plurality of objects; a radiation detector for detecting secondary radiation X-Ray signals arriving from a plurality of objects in response to irradiation of the objects by X-Ray or Gamma-Ray radiation, and providing data indicative of spatial intensity distribution of the detected data X-Ray signals on the plurality of objects; and a signal reading processor in communication with the detector, the processor being adapted for receiving and processing the detected response X-Ray signals to verify presence of the marking composition on at least one surface of each object of the plurality objects. The marking composition is identifiable by detecting a response electromagnetic signal emitted from the objects in response to irradiating the object with electromagnetic radiation. The objects are identified by X-Ray Fluorescence (XRF) analysis wherein an X-Ray spectra emitted by the marked object, in response to being irradiated by X-ray or Gamma-Ray signal, is detected and analyzed. The marking composition comprises one or more marker materials which are identifiable by X-Ray Fluorescence (XRF) analysis. In an example, the XRF analyzer is an Energy dispersive XRF analyzer (EDXRF) wherein the energy of the X-ray incoming into the detector is converted to a voltage signal without the use of a diffraction crystal. The XRF analyzer of the present invention may operate in an uncontrolled environment without vacuum conditions.

In some embodiments, the emitter assembly comprises a plurality of spaced-apart emitters. Each emitter may be adapted to generate an excitation beam with a different intensity with respect to each other.

In some embodiments, the emitter assembly comprises an emitter and a spatial intensity beam modulator coupled to the emitter configured for spatially modulating intensity of the excitation beam such that the intensity impinging on each of the objects is different and identifiable. In some embodiments, the XRF analyzer is configured and operable to identify an amount of marking composition deposited by each solid object. In particular, the signal processor is adapted to identify a concentration of a marking composition applied on at least one surface of each solid object.

In some embodiments, the signal processor is adapted to compare the concentration of marking composition applied on at least one surface of each solid object with preselected data stored in a database.

There is also provided a method for identifying a plurality objects marked by XRF marker comprising the steps of: simultaneously irradiating the plurality of objects with at least one X-ray or Gamma-ray excitation beam wherein the intensity of the beam arriving at each of the objects is different and identifiable; detecting the secondary radiation arriving from the objects; and identifying which of the plurality of objects are marked by a marking composition according to the detected spatial intensity distribution.

In some embodiments, the method comprises spatially modulating the intensity of the at least one excitation beam such that the intensity impinging on each of the objects is different and identifiable.

In some embodiments, the marking method may include the marking method described in PCT patent application number PCT/IL2017/050121 incorporated herein by reference.

In some embodiments, the marking composition is prepared with a certain (possibly unique) concentration of the one or more marker materials (which may be determined/set arbitrarily according to a preselected code).

In some embodiments, the present invention provides a novel sorting system and method for online marking and sorting a plurality of solid objects, and in particular disk-shaped solid objects such as coins, medallions, tokens, and gambling chips. The system of the present invention may also be used for marking and sorting valuables such as objects made of precious metals and/or precious stones or diamonds, jewelry (in particular inlaid jewelry). Particularly, the sorting system is configured and operable to continuously (online) mark a plurality of solid objects with a marking composition (identifiable via X-Ray Fluorescence (XRF) or alternative types of markings), detect or read the marking (for example by an XRF analyzer), and sort the objects according to the presence and the amount/concentration of the marking composition on the surface of the objects. The sorting system may mark and sort both used and newly manufactured objects. Therefore, in introducing a new marking on objects of a certain type (for example for authentication or other purposes), there is no need to replace objects that are already in use. For example, in marking coins, the sorting system may be used to mark and sort both newly manufactured coins and coins which are already in circulation.

The sorting system comprises at least one XRF analyzer configured and operable for identifying the presence of a marking composition on the at least one surface of a solid object and at least one sorter in communication with the XRF analyzer for diverting the object on which the presence of the marking composition has not been detected towards a preselected direction.

In some embodiments, the XRF analyzer is configured and operable for identifying the concentration of a marking composition. The sorter is then operable for diverting each object on which the concentration of the marking composition is below a preselected threshold towards a preselected direction.

In some embodiments, the sorting system comprises at least one marking module for applying a marking composition to at least one surface of the solid object.

In some embodiments, the marking module is adapted for applying the marking composition by using at least one of printing and vacuum deposition process.

In some embodiments, the XRF analyzer is adapted to verify the operation of the marking module.

In some embodiments, the sorting system comprises a turning mechanism adapted to expose a second surface of the object to the XRF analyzer.

In some embodiments, the sorting system comprises an XRF analyzer as described above.

In some embodiments, the sorting system comprises at least one curing module configured and operable for curing the marking composition thereby binding the marking composition to the solid objects.

The sorting system may also include additional components such as one or more cleaning modules for cleaning the objects, optical inspection module (for example for verifying the invisibility of the marking composition).

According to another broad aspect of the present invention, there is provided a method of sorting at least one solid object. The method comprises the steps of irradiating at least one solid object with at least one X-ray or Gamma-ray excitation beam; detecting a presence of a marking composition on at least one surface of the object; and sorting the object according to the presence of the marking composition.

In some embodiments, the method comprises the step of continuously marking a plurality of solid objects with a marking composition.

In some embodiments, the marking step comprises applying at least one of printing and vacuum deposition process.

In some embodiments, the method comprises verifying that the marking step has been properly applied.

In some embodiments, the method comprises detecting a presence of a marking composition on two surfaces of the object.

In some embodiments, the method comprises simultaneously irradiating a plurality of solid objects with at least one X-ray or Gamma-ray excitation beam.

In some embodiments, the sorting of the objects is performed at a capacity of up to 2000 objects per minute.

In some embodiments, the method comprises the method of identifying as described above.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
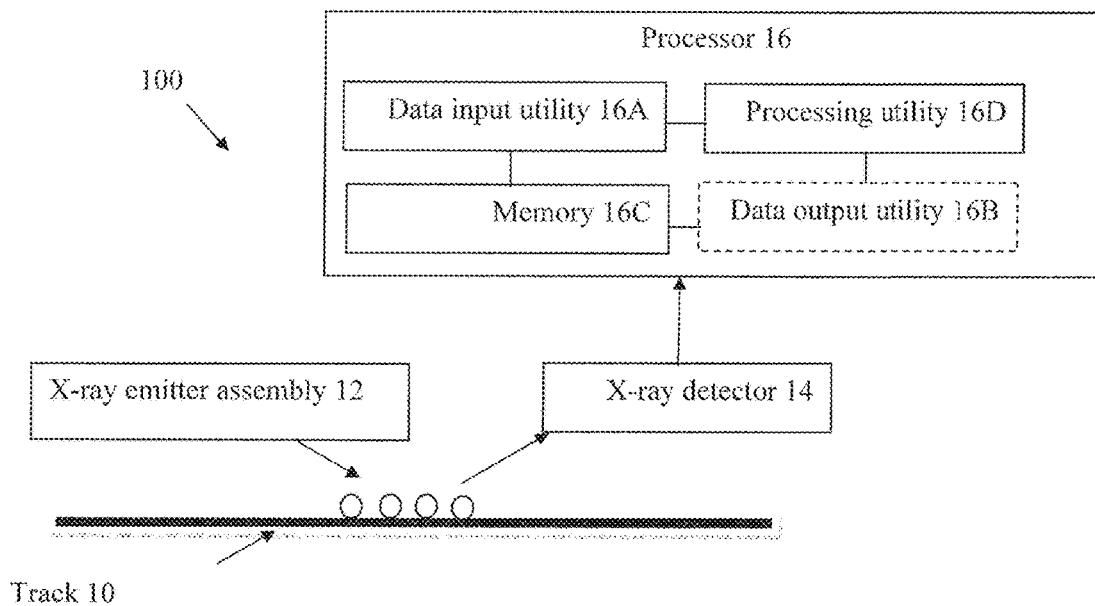
FIG. 1A shows a block diagram illustrating the XRF analyzer according to some embodiments of the present invention.

Reference is made to FIG. 1A illustrating by way of a block diagram the principal elements of an XRF analyzer 100 according to some embodiments of the present invention. The XRF analyzer 100 comprises an emitter assembly 12 adapted to emit at least one X-ray and/or gamma-ray radiation (primary radiation) having a spatial intensity distribution towards a plurality of objects under examination and an X-ray detector 14 adapted to detect the response X-ray signal (secondary radiation) that is emitted in response from the objects. The XRF analyzer 100 further includes a signal processor 16 in communication with the XRF detector 14. The processor 16 is configured to identify which of the objects that are measured in a single time step are marked, and which are not. The objects may be positioned for instance in a single row to the width of the continuous track 10 (perpendicularly to the direction of movement of the track). In order to identify which objects within a group of objects are marked and which are not, each of the objects is irradiated with a different intensity such that detecting the intensity of overall response signal from the entire group of objects in the relevant wavelength range (being proportional to the overall intensity of the incoming radiation) enables to determine exactly which objects are marked. For example, in cases wherein two objects (X and Y) are irradiated simultaneously, and wherein their respective response signals are detected simultaneously by the detector, one may irradiate object X with intensity I and the object Y with intensity 2I. Such a configuration would enable one to distinguish between the four possible results by measuring the intensity of the response signal emitted from one or more markers on the objects which is proportional to the intensity of the incoming radiation. Denoting the intensity emitted from one or more markers on object X by $I_R$ the four possible outcomes are summarized in Table 1:

| Outcome | Response signal intensity |
| --- | --- |
| Both objects X and Y are marked | $3I_R$ |
| Object X unmarked Object Y marked | $2I_R$ |
| Object X marked Object Y unmarked | $I_R$ |
| Both objects X and Y are unmarked | 0 |

In another example, one may identify which objects are marked out of a group of three objects (X, Y and Z) which are examined simultaneously by irradiating object X with intensity I, object Y with intensity 2I, and object Z with intensity 4I. Such a configuration enables one to identify exactly which of the three objects are marked by distinguishing between 8 intensities of the response signal (if the intensity of the response signal from object X is $I_R$ then the 8 possible intensities of the response signal from all three objects would be: 0, $I_R$, $2I_R$, ... $7I_R$). Although for the sake of simplicity, two examples using two or three objects are presented, the present invention is not limited to a particular number of objects and any combination of intensity of the response signal can be detected.

In the general case, wherein k objects are irradiated simultaneously, in order to identify which of the k objects are marked, the different objects should be irradiated with intensities I, $2^1$I, $2^2$I, ..., $2^{k-1}$I. The intensity of the response signal from the one or more markers will then be one of 0, $I_R$, ... $(2^k-1)I_R$ corresponding to the $2^k$ possible sets of marked objects.

Figure 1B:
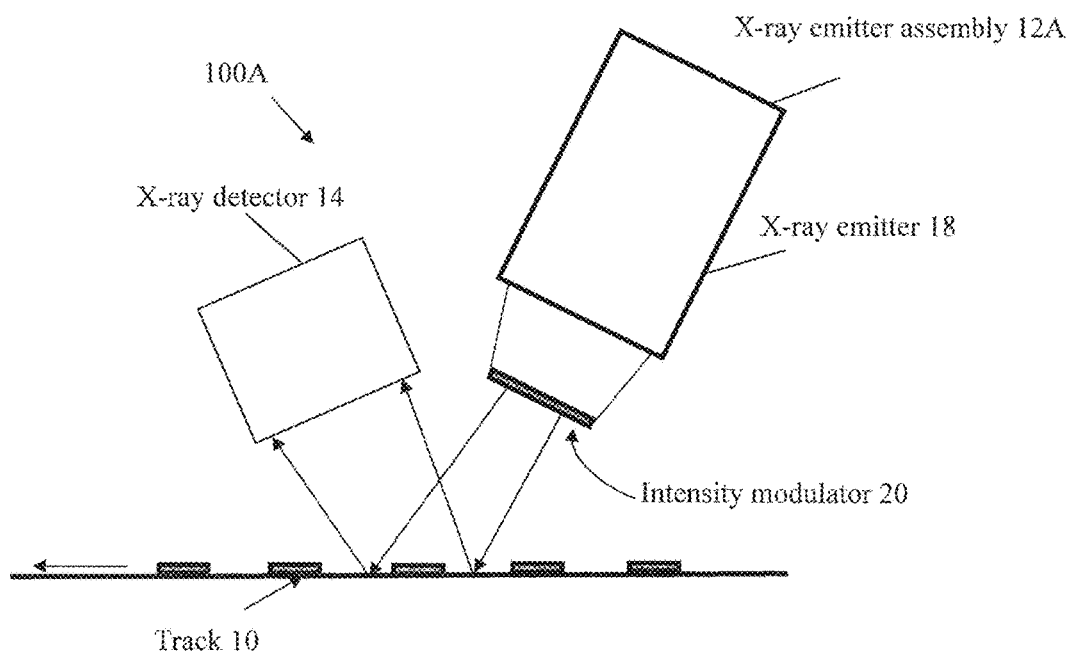
FIG. 1B schematically shows an illustration of a possible configuration of the XRF analyzer according to some embodiments of the present invention.
Figure 1C:
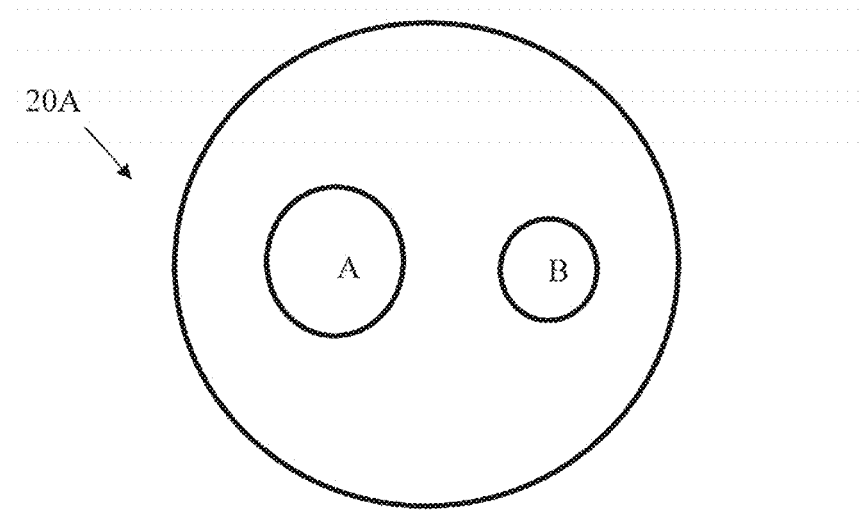
FIG. 1C schematically shows an illustration of a possible configuration of the intensity modulator of the XRF analyzer according to some embodiments of the present invention.

In order to irradiate a plurality of objects with different preselected intensities, one may use a plurality of emitters emitting a plurality of excitation beams. Alternatively or additionally, one may use a single emitter with a spatial intensity beam modulator as illustrated in FIGS. 1B-1C below, which modulate the beam such that different areas or zones within the overall irradiated area receive different intensities of radiation. Therefore, by modulating the intensity of the emitted radiation, the technique of the present invention provides a unique signature to the XRF marker, enabling easy sorting and separation of the objects under examination.

The XRF analyzer 100 may be constructed as a single device including the radiation emitter 12 and the radiation detector 14. Alternatively, the radiation emitter 12 and the radiation detector 14 may be constructed as separate devices. In an alternative design the XRF analyzer 100 may include two or more emitters and two or more detectors. The signal processor 16 may process the response X-ray signal so as to filter out the background radiation noise and clutter from the response signal. The signal processor 16 may employ more advanced methods for processing the response signal, for example statistical methods, such as time series analysis, in order to obtain an enhanced response signal with an improved SNR and SCR. For example, the signal processor 16 may use the methods described in International application PCT/IL2016/050340.

It should be noted that generally the XRF analyzer of the present invention may be implemented by analogue and/or digital means. In some cases the XRF analyzer includes a computerized system including a computer processor (CPU) and a memory. The modules of the analyzer may thus be implemented by suitable circuitry and/or by software and/or hardware components including computer readable code configured for implementing the operations of methods 200 and/or 400 described below. The XRF analyzer of the present invention may be implemented as part of an XRF signal processing center, and/or as a portable (e.g. handheld) XRF reading device.

Signal processor 16 comprises a data input utility 16A including a communication module for receiving the response X-ray signal, an optional data output utility 16B for generating data relating to identified object(s), a memory (i.e. non-volatile computer readable medium) 16C for storing database i.e. preselected data indicative of marking signatures of the objects and of the intensity of the response signal versus the geometrical position of the object, and a data processing utility 16D adapted for identifying which of the measured objects are marked and which are not. The database may be implemented with Microsoft Access, Cybase, Oracle, or other suitable commercial database systems. In some embodiments the XRF analyzer 100 is configured in a cloud-based configuration and/or utilize Internet based computing so that parts of processing utility 16D, and/or memory 16C may reside in multiple distinct geographic locations. Upon activation of the XRF analyzer 100 the processor 16, signals to radiation emitter assembly 12 to emit radiation (e.g. X-ray radiation). Processor 16 detects a radiation fluorescence signal pattern via radiation detector 14 which is emitted from a XRF marker on the objects (if any). Processor 16 may transmit data regarding the fluorescence signal pattern (such as fluorescence wavelength and or intensity) via the data output utility 16B, via a data communication (e.g. via cellular network) to a communication module of a central computer. The processor 16 may record the received data in database in memory 16C and/or may query/cross-reference the received data with data in the database to identify if the object has been marked and may retrieve object data (e.g. concentration of the marker) and may communicate such object data to a mobile device at which processor 16 may signal to display a message corresponding to the object data. To this end, the preselected data stored in a database may be used to compare the fluorescence pattern/XRF-signature of the detected XRF markers with the signatures/chemical-compositions of a plurality of XRF markers previously used for marking objects and stored in the database. For example, the concentration of the marking composition may be identified by storing in a database, before the analyzing of the objects, a plurality of XRF signature responses being indicative of a certain concentration of a certain marker(s). In another example, the marking composition is prepared with a certain (possibly unique) concentration of the one or more marker materials (which may be determined/set arbitrarily according to a preselected code). Then, only after the marking composition is applied to the surface of the object, the XRF response signal is read from the marking that is applied to the specific sample substrate, and the XRF response signal is set as the code-word of the marking corresponding to the object. The correspondence between the specific XRF response signature (being indicative of the specific marking) and the specific sample substrate (and not only the marking composition) may be stored in a database. In this case, the concentration(s) of the marking element(s) is/are not determined a priori based on a preselected code, but instead, the code is determined/measured a posteriori only after the marking composition (possibly including arbitrary concentrations of marking elements) is applied to the sample substrate. Thus, the concentration(s) and/or relative concentration(s) of the marker material(s) may or may not be determined a priori based on a desired code-word of the marking. In some cases, the code-word may be determined a posteriori only after a marking composition having certain (not necessarily known) concentration(s) of element(s) is applied to an object (e.g. a reference object/component) of the type/material similar to that of the component that is to be marked by the marking composition.

The data processing utility 16D may include sample and hold circuitry, analog to digital converters (ADC), digital to analog converters (DAC) and some working memory which enables the data processing utility to receive the X-ray response signals. After the X-ray response signal(s) is/are received, the data processing utility 16D is also enabled to process the signal(s). Results of signal processing step may be displayed and/or stored in storage and/or sent to data communication unit for transfer over a wide area network, e.g. Internet. It should be understood that such a "processing utility" is constituted by a software product installed on a "server" system, e.g., "cloud computer", or may be a "client computer", e.g. application program interface (API) in a client's personal communication device, such as a mobile phone, or various modules of the computer system may be distributed between the server and client computers (i.e. distributed software). The memory 16C may include instructions executable by data processing utility 16D. The instructions may be operable to enable data processing utility 16D to receive the X-ray response signal(s), to process the X-ray response signal(s), to identify which object is marked, and to output via the data output utility 16B a notification regarding the object(s) marked. Memory 16C and may be relayed via wireless or wired connection by an external unit to a central database.

The features of the present invention may comprise a general-purpose or special-purpose computer system including various computer hardware components, which are discussed in greater detail below. Features within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, without limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Computer-readable media may include a computer program or computer application downloadable to the computer system over a network, such as a wide area network (WAN), e.g. Internet.

In this description and in the following claims, a "processor" is defined as one or more software modules, one or more hardware modules, or combinations thereof, which work together to perform operations on electronic data. For example, the definition of data analyzer includes the hardware components of a personal computer, as well as software modules, such as the operating system of the personal computer. The physical layout of the modules is not relevant. A computer system may include one or more computers coupled via a computer network. Likewise, a computer system may include a single physical device (such as a phone or Personal Digital Assistant "PDA") where internal modules (such as a memory and processor) work together to perform operations on electronic data. While any computer system may be mobile, the term "mobile computer system" or the term "mobile computer device" as used herein especially includes laptop computers, netbook computers, cellular telephones, smart phones, wireless telephones, personal digital assistants, portable computers with touch sensitive screens and the like.

The term "server" as used herein refers to a computer system including a processor, data storage and a network adapter generally configured to provide a service over the computer network. A computer system which receives a service provided by the server may be known as a "client" computer system.

A "network" is defined as any architecture where two or more computer systems may exchange data. The term "network" may include wide area network, Internet local area network, Intranet, wireless networks such as Wi-Fi™, virtual private networks, mobile access network using access point name (APN) and Internet. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

The articles "a", "an" as used herein, such as "a processor", "a server", "a sample" have the meaning of "one or more" that is "one or more processors", "one or more servers" and "one or more samples".

According to an embodiment of the present invention the processing utility 16D may also determine the concentrations of the markers and/or binders present within the marking composition. The processing utility 16D is also configured to compare the measured concentrations with the concentrations derived from a preselected data which is stored in the memory 16C.

FIG. 1B shows another possible configuration of the XRF analyzer 100A, according to some embodiments of the present invention in which the emitter assembly 12A comprises a single emitter 18 with a spatial intensity beam modulator 20 adapted to modulate the radiation beam such that different areas or zones within the overall irradiated area receive different intensities of radiation. The beam modulator 20 may include a single aperture with varying width such that the intensity of radiation arriving at the objects varies along one or more directions. In an embodiment the collimator of the emitter 18 may be configured to operate also as a beam modulator (in addition to collimating the beam).

Figure 1D:
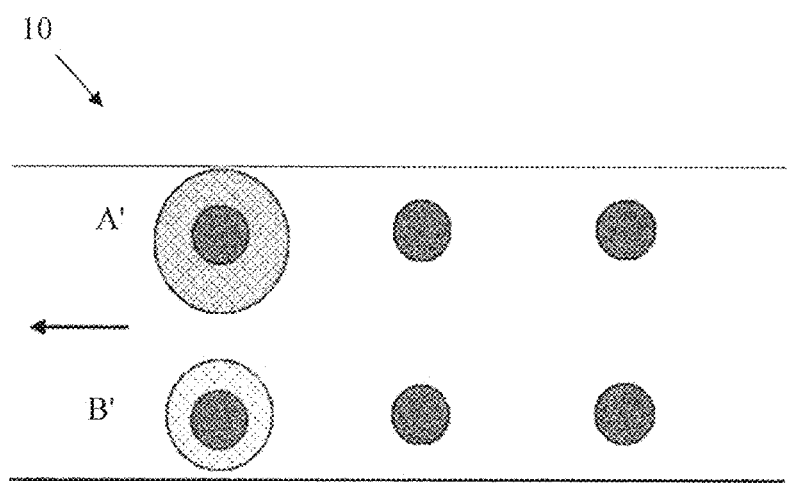
FIG. 1D schematically shows radiation of different intensities impinging on a plurality of objects according to some embodiments of the present invention.

The beam modulator 20 may be constructed as an element with a number of apertures of different dimensions each corresponding to a zone which is irradiated with a preselected intensity. This specific and non-limiting example is illustrated in FIG. 1C showing a beam modulator 20A with two apertures A and B of different geometrical dimensions configured to distribute the electromagnetic radiation arriving from the emitter assembly 12 (not shown) between two zones such that the intensity of radiation arriving to the first zone via the bigger aperture A is about four times the intensity arriving at the second zone via the smaller aperture B. For simplicity, the figure is not represented to scale. Such a configuration enables the XRF analyzer to identify which objects are marked and which are not. Reference is made to FIG. 1D, in which the XRF analyzer is configured to examine two rows of objects advancing in parallel on a continuous track or a conveyor belt simultaneously. The XRF analyzer is configured to examine two columns of objects at each time step. As shown in the figure, the radiation impinges on a column of two objects with a different radiation intensity represented by the different radiation beams dimensions A' and B' corresponding to the different apertures of the intensity modulator A and B of FIG. 1C. Although for the sake of simplicity, two objects under examination are represented, the present invention is not limited to the number of objects to be examined simultaneously.

Figure 2:
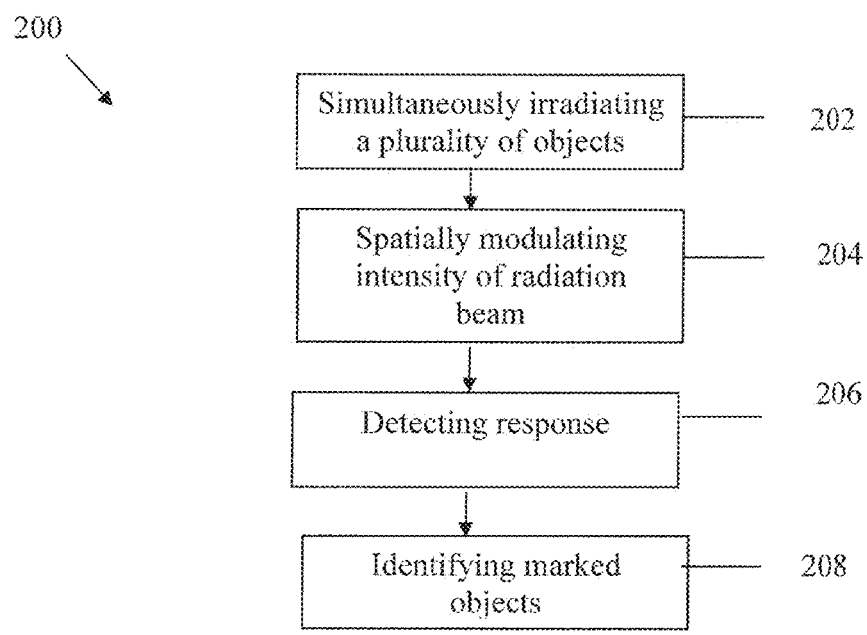
FIG. 2 shows a flow diagram of a method for identifying a plurality of objects simultaneously according to some embodiments of the present invention.

Reference is made to FIG. 2 illustrating by the way of a flow chart the principal steps of a method for simultaneously identifying a plurality of objects according to some embodiments of the present invention. The method 200 comprises the step 202 in which a plurality of objects are simultaneously irradiated with at least one excitation beam. The objects may be arranged in a spaced-apart configuration along at least one row, at least one column, or any combination thereof. The geometrical arrangement of the objects corresponds to the geometrical distribution of the intensity to enable identification of the marked objects. In step 204, the intensity of the at least one excitation beam is modulated such that the intensity impinging on each of the objects is different and identifiable. The intensity of the excitation beam may be modulated by using an intensity modulator coupled to an emitter which modulates the beam such that different areas or zones within the overall irradiated area receive different intensities of radiation. Alternatively or additionally, the intensity may be spatially modulated by operating simultaneously a plurality of emitters, each emitter emitting at a different intensity. In this latter case, steps 202 and 204 are performed simultaneously. In step 206, the radiation arriving from the plurality of objects is detected and signals indicative of the spatial intensity distribution on the plurality of objects are generated. The detection of the radiation comprises measuring the intensity of the response signal emitted from one or more markers on the objects which is proportional to the intensity of the incoming radiation. In step 208, specific marked objects from the plurality of objects are identified. In order to identify which objects within a group of objects are marked and which are not, each of the objects is irradiated with a different intensity, such that detecting the intensity of overall response signal from the entire group of objects in the relevant wavelength range (being proportional to the overall intensity of the incoming radiation) enables to determine exactly which objects are marked. As described above, the method 200 may also comprise further processing steps (not shown) such as filtering out the background radiation noise and cluttering it from the response signal. In some embodiments, concentration of the marker present in each object (if any) may be also determined and may be compared to a preselected data stored in the database. In some embodiments, the method 200 may also comprise the step of advancing a plurality of objects to be analyzed along a continuous track placed under the XRF analyzer.

Method 200 may further comprise recording a marking in a database. The database may be configured to provide a unique code corresponding to a detectable composition marking. The unique code may correspond to an XRF fingerprint/signature associated with the detectable composition marking Unique codes may be generated for each combination of marker or combination of markers. For example, method 200 may include storing in the database preselected data indicative of the signature of the marking composition used for marking the object and possibly also storing association data associating properties and/or identity of the object with the signature of the marking Optionally, method 200 may further include comparing the received XRF data to data in the database. Received XRF data may be logged in a database. Logged received XRF data may be used for future analyses of future samples. Optionally, method 200 may further include assessing identity of a sample based on the database data. Assessing identity may be performed using a statistical analysis in which received XRF data is compared to database XRF data and a statistical comparison is performed. If a predetermined level of similarity is shown, the XRF data is considered to be from a matching sample.

Figure 3:
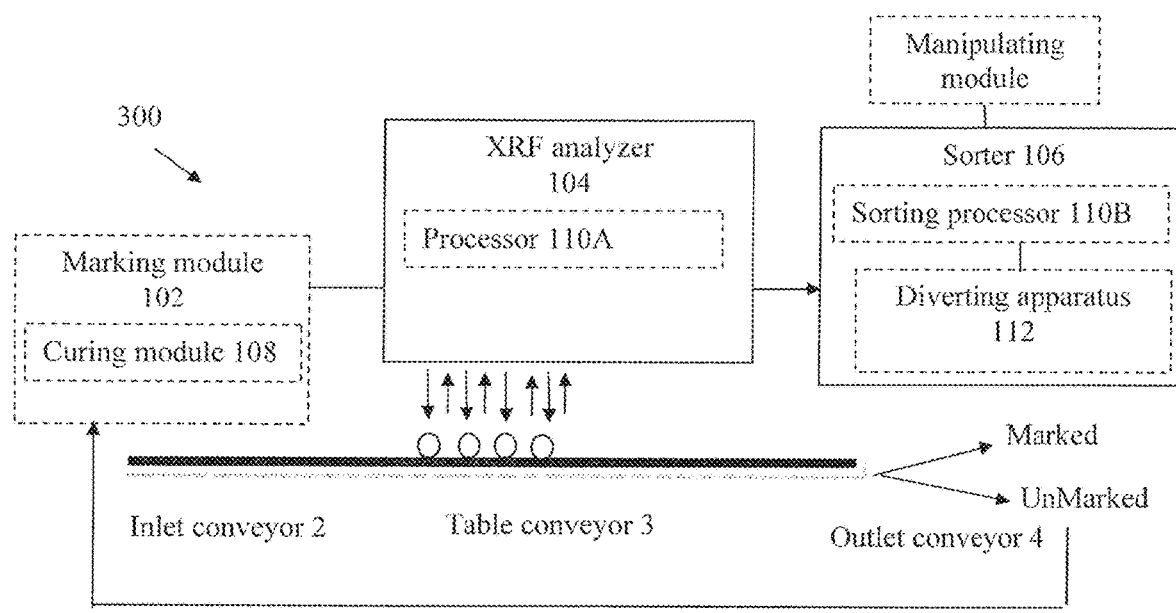
FIG. 3 shows a block diagram illustrating the sorting system according to some embodiments of the present invention; and, FIG. 4 shows a flow diagram of a method for sorting a plurality of objects according to some embodiments of the present invention.

Reference is made to FIG. 3 showing by way of a block diagram the principal functional parts of the novel sorting system 300 of the present invention. A single object may be examined or, alternatively, a plurality of solid objects (hereinafter "objects") may be continuously fed into the sorting system 300 and moved between the different modules by a continuous track such as a conveyor system or a conveyor belt. The sorting system 300 may comprise or may be coupled to a conveyor system including an inlet conveyor 2 upstream of the XRF analyzer 104; a conveyor table 3 adapted to receive the solid object(s) from the inlet conveyor 2 and adapted to move the solid object(s) to the XRF analyzer 104, and an outlet conveyor 4 downstream of the XRF analyzer 104 for receiving the object(s) after having been processed by the XRF analyzer 104. The conveyor table 3 is movable towards and away from the XRF analyzer 104. Conveyor table 3 may be formed with vacuum openings connected to a suction control to apply vacuum in order to hold the object(s) firmly against the table when a processing operation is to be performed by XRF analyzer 104 on the object(s) carried by the conveyor table 3. After the processing operation is performed on the object, it is conveyed by conveyor table 3 to the outlet conveyor 4. This outlet conveyor 4 is similarly constructed as the inlet conveyor 2. In this specific and non-limiting example, the XRF analyzer 104 is located laterally from the normal position of the conveyor table 3.

The sorting system 300 comprises at least one XRF analyzer 104 configured to identify the presence of a marking composition on at least one surface of the object and at least one sorter 106 configured for sorting the object on-line as the object continuously passes though the sorting system 300.

In some embodiments, the XRF analyzer 104 may be configured for verifying that the object is adequately marked. The sorter 106 may also be configured for diverting unmarked or partially marked object(s).

The XRF analyzer 104 is capable of identifying the marking on both new and used objects. For example, when used for marking and sorting coins, the sorting system 300 may mark and/or read the marking on both new coins and used coins that are already in circulation. The object which enter the sorting system 300 may have been marked a certain period of time before the sorting (e.g. coins already in circulation) or may have been marked online (e.g. new coins). If the object has to be marked online, the sorting system 300 may also comprise at least one marking module 102 configured to mark at least one surface of the object by applying a marking composition to at least one surface of an object. In this case, the XRF analyzer 104 is then configured for validating that the marking process has been performed accurately.

The sorting system 300 may be used in the marking mode for marking new coins or otherwise unmarked coins. For the purpose of marking used coins which are already in circulation (and therefore may include also previously marked coins) the sorting system 300 may be used in a first step in the sorting mode (wherein for example the coins are verified as authentic non-faked coins by other means) to sort the coins to marked and unmarked coins and in a second step in the marking mode to mark the unmarked coins. When a sufficient percentages of the coins in circulation are marked, the sorting system 300 may be used, in the sorting mode, as an anti-counterfeit measure wherein all the unmarked coins are deemed as fake coins and are discarded. While operating the device in the marking mode, the object to be marked is moved by the continuous track through the different modules of the sorting system 300 in the following order: first the marking module 102 marks the object; the object then passes through the XRF analyzer 104 which reads the marking and verifies that the object is adequately marked (alternatively, the reading module may be idle or turned off in this mode); the object then passes through the sorter 106 which diverts the object that are not adequately marked to a separate track or collection means; optionally the object that was adequately marked then passes through the curing/adhesion module 108 wherein the marking composition is cured and adheres to the object. The marked object then leaves the sorting system 300 towards an additional track or collection means. The curing module 108 may be positioned after the marking module 102 such that the marked object passes through the curing module 108 before being inspected by the XRF analyzer. Alternatively, the curing module may be installed after the XRF analyzer 104. In yet another example, the curing unit 108 may be installed after the sorter 106 such that the marking composition undergoes curing only after the object has been sorted. The object which is not properly marked does not undergo curing such that the marking composition may be easily washed off the surface of the objects. An object which is not properly marked may then be re-fed to the sorting system 300 to be re-marked.

The sorting system 300 may also include an optical inspection module (not shown) for preliminary inspection of the marked object before the checking of the marking by the XRF analyzer 104. The optical inspection module may inspect the visual appearance of the marked object (for example verifying that the marking is invisible). The optical inspection system may inspect the marking by comparing an image of the marked object with a preselected image of an object that is stored in a database.

The sorter 106 comprises a processor 110B (hereinafter "sorting processor") which controls a diverting apparatus 112 located at the end of the outlet conveyor 4. The sorter 106 accesses data indicative of a certain amount of marking composition per XRF signature in a database stored in a memory and uses the data to execute the sorting. The data may also include sorting parameters, and the results of comparison. Once the data is stored in a database, such data may be analyzed using known database analysis tools, such as a query language, such as, for example, Microsoft SQL. The sorting processor 110B determines according to this comparison, and optionally according to user input, which of the objects are marked and which are unmarked (or only partially marked). The sorting processor 110B is thus configured to receive from the XRF analyzer 104 via a communication module, data indicative of the presence of the marking object, and controls the operation of the diverting apparatus 112 to selectively divert only the unmarked objects. The sorting processor 110B then classifies the object based on the XRF signature of the object, and activates the diverting apparatus 112. The diverting apparatus 112 diverts the unmarked object from the continuous track towards a different track or collection means. The diverter apparatus 112 may take the form of a shaft of a solenoid that is notched so that it either forms a continuation of the track or a barrier on the track. The diverter apparatus 112 is actuated by sorting processor 110B that receives data from processor 110A which senses each object moving along the track and provides a signal indicative of the marking of each object. The diverting apparatus 112 may employ mechanical arms; electrical, pneumatic and hydraulic pistons, as well as magnets, electro-magnets and/or air pressure to divert the object away from the continuous track or conveyor system to a separate track or collection means. For example, when one of the air jets receives a signal from the sorting processor 110B, that air jet emits a stream of air that causes the object to be ejected from the conveyor system into a sorting bin corresponding to that air jet. High speed air valves from Mac Industries may be used, for example, to supply the jets with air pressure at, for example, 60-90 psi, with operating/closing times of 15 ms. Other methods may be used to eject the object, such as robotically removing the object from the conveyor system, pushing the object from the conveyor system, or causing an opening in the conveyor system from which an object may drop.

The functions of the sorting processor 110B may be performed by processor 110A forming a single unit, located within the sorting system 300 or externally to it. The signal processor 110A of the XRF analyzer 104 may be used also as the sorting processor 110B. The signal processor 110A of the XRF analyzer 104 and/or the sorting processor 110B may control operation of the sorting system. Alternatively, both the signal processor 110A of the XRF analyzer 104 and the sorting processor 110B are controlled by a controller which controls operation of the sorting system 300.

The marking module 102 is configured to apply a marking composition to the object. The marking composition applied to the object may include one or more markers. The marker is a compound which includes one or more elements which can be identified by X-Ray Fluorescence (XRF) analysis. Namely, elements which in response to X-ray or Gamma-ray (primary radiation) emit an X-ray signal (secondary radiation) with spectral features (i.e. peaks in a particular energy/wavelength) which characterize the element (hereinafter reference to such an X-ray response signal is indicated as an XRF signature). The marking composition may also include one or more binders, wherein a binder is a compound which binds the marker to the surface of the metallic object (e.g. thermoset polymers). The marking module 102 may use surface treatment in order to bind the marking composition to at least one surface of the object. The marking composition may also include solvents, dispersants, etching agents, surfactants, and adhesion promoters. Marking compositions which may be used for marking object by the marking module are described, for example, in PCT patent application No. PCT/IL2017/050121 which is incorporated herein by reference.

The marking composition may be applied to the object by an ink jet printing device, such as drop-on-demand inkjet. In such an inkjet printing device a piezoelectric or heating device attached to the printing head, forces the material to escape the printing nozzle in the form of pico-liter drops. The number of printing heads in the marking module is set by the number of objects in a single row on the continuous track which are marked in a single time step. Other methods which may be employed for applying the marking composition to the metallic object include: ultrasonic spray nozzle coating, dip coating, spin coating, plasma spraying, electrophoretic deposition (EPD), hot melt coating, and knife-over-roll coating. In addition, the marking composition may be applied to the surface of an object by vacuum deposition methods wherein the deposition process is carried out at a pressure which is well below atmospheric pressure or in a vacuum (i.e. in a vacuum chamber). In general, vacuum deposition processes enable the deposition of layers which range in thickness from a single atom up to a few millimeters. The material being deposited on a substrate in such methods is in a vapor state.

Preferably, the vacuum deposition process which may be used in such marking techniques utilizes Chemical Vapor Deposition (CVD) in which the vapor is generated by chemical reactions which include one or more precursors. The precursors typically comprise organometallic compounds. The category of CVD includes various processes such as low-pressure chemical vapor deposition (LPCVD), Plasma-Enhanced Chemical Vapor Deposition (PECVD), Plasma-Assisted CVD (PACVD), and Atomic Layer Deposition (ALD).

Alternatively, or additionally, the process of depositing the marker material(s) on the object includes Physical Vapor Deposition (PVD) in which the vapor source is solid or liquid. A PVD process may use techniques such as sputtering, cathodic arc deposition, thermal evaporation, laser ablation serving as a (solid) precursor to generate vapor, and electron beam deposition, to generate the deposited particles in a vapor phase.

Vacuum deposition methods allows for depositing a layered structure carrying one or more markers, e.g. uniform overall layers of compounds (including markers) over the surface of an object, e.g. a continuous (unpatterned) layered structure/film or layered structure/film formed by discrete spaced-apart regions of the deposited compounds (being deposited via a mask).

The accuracy of the vacuum deposition process and the uniformity of the layer facilitates fast and accurate measurement of the concentration of deposited markers. The marking layer deposited by vacuum deposition methods is resilient and wear-resistant.

In order to apply a marking composition on an object by a vacuum deposition method online (for example to objects on a continuous track or a conveyor belt) one may use one or more pressure chambers through which the object on the continuous track passes prior to entering the vacuum chamber in which the markers are deposited onto the object.

In some embodiments, the marking module 102 comprises a curing/adhesion module 108 for curing and/or bonding the marking composition. The curing module is configured to cure the marking composition such that the marking composition becomes hardened (for example, by forming cross-links) and adheres to the marked object. The curing module/adhesion module 108 may employ electron beams, heat, chemical additives and/or UV radiation to bind the marking composition to the object. The curing/adhesion module 108 may also employ vaporization of a solvent to achieve adhesion of the marking composition to the object. When curing module 108 is used, since the unmarked object is diverted to a separate track before undergoing curing in the curing/adhesion module 108, the marking composition may be washed away from the object such that the object may undergo the marking process without having an additional layer of marking composition applied to it. A single layer marking may be important when used as a covert anti-counterfeit measure wherein invisibility of the marking may be beneficial, or when a thick layer of the marking composition may affect other properties of the object. For example, in marking coins it may be essential not to affect the chemical, mechanical, electric, and magnetic properties of the coin.

In some embodiments, the sorting system 300 is capable of identifying two surfaces of the object. For example, in marking coins it may be beneficial to identify both faces (heads and tails) of the coin. Namely, the object is moved into the sorting system 300 by a continuous track, the first surfaces of the object are read by the XRF analyzer 104; an unmarked object is then diverted away to a separate track; then the object may be turned or flipped by any manipulating module 114 (e.g. flipping/turning mechanism) such that the second surface can be easily read. The second surface of the object is then read by XRF analyzer 104; and an unmarked object (that is, an object whose second surface is not adequately marked) is diverted away from the continuous track. To this end, the sorting system 400 may include two XRF analyzers and two sorters (not shown), each of them being configured for analyzing one face of the object.

Moreover, in marking coins it may be beneficial to mark both faces (heads and tails) of the coin. To this end, the marking module 102 may be adapted for marking the two faces of the object. Alternatively, the sorting system 300 may comprise two marking modules (not shown). The marking of the both surfaces of the object by the marking composition can be done sequentially. The marking composition may be cured and/or bonded to the surfaces of the object by a single curing/adhesion module. Alternatively, the curing of the marking composition can be carried out by two curing/adhesion modules (not shown).

In a second example the marking reading and sorting of both surfaces of the object may be done in parallel. Namely, both surfaces are marked by the same marking module or a first and second marking modules; then the marking is read by the same XRF analyzer or a first and second XRF analyzers; then the unmarked object, namely an object whose one surface is not adequately marked, is diverted away from the continuous track; and then the marking composition is cured by either one or two curing modules.

Figure 4:
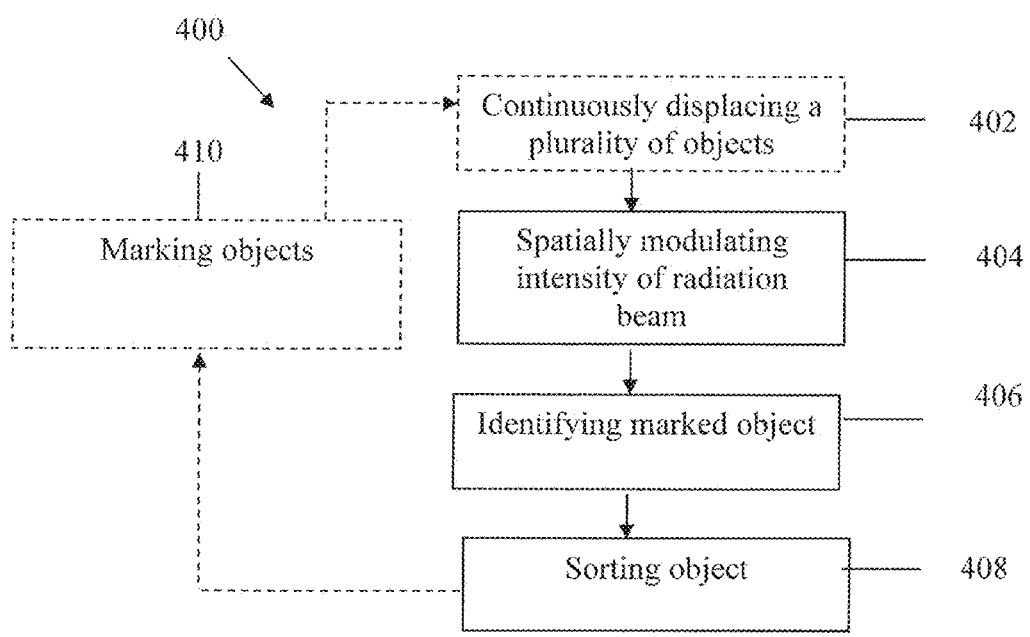

Reference is made to FIG. 4 showing by way of a flow chart diagram the principal steps of the novel sorting method 400 of the present invention. In an initial optional step 402, a single object or a plurality of solid objects (hereinafter "objects") is/are continuously fed into the sorting system 300 and moved between the different modules by a continuous track such as a conveyor system or a conveyor belt. In step 404, the intensity of the radiation beam is spatially modulated. In this case, a plurality of objects are examined simultaneously, and the plurality of solid objects are simultaneously irradiated with an excitation beam. In step 406 a presence of a marking composition is detected on at least one surface of the object and the marked object is identified. In step 408 the object is sorted according to the presence of the marking composition.

In some embodiments, the method 400 may comprise the step 410 of marking the object. This step 410 may be performed initially before the sorting of the object to verify proper marking of the object. Alternatively or additionally, this step 410 may be performed after the sorting of the object only on an unmarked or partially marked object. This method 400 has a capacity of up to 2000 objects per minute. In some embodiments, the method 400 has a capacity of about 2000 to about 5000 objects per minute. The technique may mark, read the marking, and sort the objects into two separate tracks or outputs (for marked and unmarked objects) at a rate of up to 5000 objects per minute. The objects may be positioned on the continuous track in a single line such that they are marked, read (checked for the presence of the marking composition) and sorted, one by one. Alternatively, the objects may be positioned on the continuous track in rows which may include two or more objects, such that the entire row is marked, and read at the same time and then sorted into separate outputs for marked and unmarked objects. The presence and amount of marking composition may be read on an individual object even in cases where an entire row of objects is checked at the same time. That is, even in cases where an entire row is read in a single time step, marked and unmarked objects are identified in the row, reliably sorting the objects into two separate outputs. In an embodiment, a row of objects on the continuous track may include between two and ten objects. For example, a single row may include five objects.

The technique of the present invention is thus operable in a number of modes, i.e. marking mode and sorting mode, for achieving different tasks. In the marking mode, including step 410, an unmarked object is continuously displaced (e.g. fed into the sorting system) and a marking composition is applied to at least one surface of the unmarked object. In this marking mode the reading and sorting capabilities are used only to verify that the object has been properly marked (by measuring the concentration of a marker material included in the marking composition), and to divert the unmarked or partially marked object to a separate output such as a separate track or collection means to be remarked. In the sorting mode, both marked and unmarked objects are continuously displaced (e.g. fed into the sorting system) and the objects are sorted by diverting the unmarked objects to a separate output. The marking step 410 is not used in the sorting mode. The unmarked objects can then be marked in the marking step 410 of the marking mode. Alternatively, the unmarked objects may be deemed as fake or counterfeit, or otherwise defective and discarded. In a specific and non-limiting example, in the marking mode the object to be marked is moved by the continuous track in step 402 through the different modules of the sorting system in the following order: first in the marking step 410 the object is marked; the object then is read in steps 404 to verify that the object is adequately marked; the object then is sorted in step 408 and an object that is not adequately marked is diverted to a separate track or collection means. Optionally, the marking step 410 comprises a curing step (not shown) in which an object that has not been adequately marked then passes through a curing/adhesion module wherein the marking composition is cured and adheres to the object. The marked object then leaves the sorting system towards an additional track or collection means.

The invention claimed is:

1. A XRF analyzer comprising:
an emitter assembly adapted for emitting at least one X-ray or Gamma-ray excitation beam having a spatial intensity distribution for irradiating simultaneously a plurality of solid objects;
an X-ray detector measuring secondary radiation emitted by the plurality of objects and generating signals indicative of spatial intensity distribution of detected X-ray data on the plurality of objects; and
a signal processor in communication with the detector for receiving and processing the detected response X-ray signals to identify a presence of a marking composition at least on one surface of each object of the plurality of solid objects.

2. The XRF analyzer of claim 1, wherein said emitter assembly comprises at least one of: (i) a plurality of spaced-apart emitters, each emitter being adapted to generate an excitation beam with a different intensity with respect to each other, (ii) an emitter and a spatial intensity beam modulator coupled to said emitter configured for spatially modulating intensity of the excitation beam such that the intensity impinging on each of the objects is different and identifiable.

3. The XRF analyzer of claim 1, wherein said signal processor is adapted to identify a concentration of a marking composition applied on at least one surface of each solid object.

4. The XRF analyzer of claim 3, wherein said signal processor is adapted to compare the XRF signal indicative of a certain concentration of marking composition applied on at least one surface of each solid object with preselected data stored in a database.

5. A method comprising:
simultaneously irradiating a plurality of objects with at least one X-ray or Gamma-ray excitation beam having a spatially distributed modulated intensity; wherein the intensity of the beam arriving at each of the objects is different and identifiable;
detecting a secondary X-ray radiation arriving from the plurality of objects and generating signals indicative of the spatial intensity distribution on the plurality of objects; and
identifying which of the plurality of objects are marked by a marking composition according to the detected spatial intensity distribution.

6. The method of claim 5, comprising spatially modulating the intensity of said at least one excitation beam such that the intensity impinging on each of the objects is different and identifiable.

7. A sorting system comprising:
at least one XRF analyzer of claim 1 for identifying presence of a marking composition on at least one surface of at least one solid object and generating data indicative thereof;
at least one sorter in communication with said XRF analyzer for diverting the object on which the concentration of the marking composition is below a preselected threshold towards a preselected direction.

8. The sorting system of claim 7, wherein said XRF analyzer is adapted for identifying a certain concentration of a marking composition.

9. The sorting system of claim 7, comprising at least one marking module for applying a marking composition to at least one surface of the solid object.

10. The sorting system of claim 9, wherein said XRF analyzer is adapted to verify the operation of said marking module.

11. The sorting system of claim 7, comprising a turning mechanism adapted to expose a second surface of the object to the XRF analyzer.

12. A method of sorting comprising:
simultaneously irradiating a plurality of solid objects with at least one X-ray or Gamma-ray excitation beam having a spatially distributed modulated intensity; wherein the intensity of the beam arriving at each of the objects is different and identifiable;
detecting a secondary X-ray radiation arriving from the plurality of objects and generating signals indicative of the spatial intensity distribution on the plurality of objects;
identifying which of the plurality of objects are marked by a marking composition according to the detected spatial intensity distribution;
detecting a presence of a marking composition on at least one surface of the object; and
sorting the object according to said presence of the marking composition.

13. The method of sorting of claim 12, comprising the step of continuously marking a plurality of solid objects with a marking composition.

14. The method of sorting of claim 12, comprising verifying the marking step.

15. The method of sorting of claim 12, comprising detecting a presence of a marking composition on two surfaces of the object.

16. The method of sorting of claim 12, comprising spatially modulating the intensity of said at least one excitation beam such that the intensity impinging on each of the objects is different and identifiable.

17. The sorting system of claim 7, wherein said emitter assembly comprises at least one of: (i) a plurality of spaced-apart emitters, each emitter being adapted to generate an excitation beam with a different intensity with respect to each other, (ii) an emitter and a spatial intensity beam modulator coupled to said emitter configured for spatially modulating intensity of the excitation beam such that the intensity impinging on each of the objects is different and identifiable.

18. The sorting system of claim 7, wherein said signal processor is adapted to identify a concentration of a marking composition applied on at least one surface of each solid object.

19. The sorting system of claim 18, wherein said signal processor is adapted to compare the XRF signal indicative of a certain concentration of marking composition applied on at least one surface of each solid object with preselected data stored in a database.

20. The method of sorting of claim 13, wherein said marking comprising applying at least one of printing and vacuum deposition processes.

* * * * *